United States Patent
Rizzi et al.

(10) Patent No.: US 9,931,753 B1
(45) Date of Patent: Apr. 3, 2018

(54) METHODS AND DEVICES FOR AUTOMATIC GAIT TRANSITION

(71) Applicant: Google Inc., Mountain View, CA (US)

(72) Inventors: Alfred Anthony Rizzi, Mountatin View, CA (US); Kevin Blankespoor, Mountain View, CA (US); Matthew David Malchano, Mountain View, CA (US); Mathew Livianu, Mountain View, CA (US)

(73) Assignee: Boston Dynamics, Inc., Mountain View, CA (US)

( * ) Notice: Subject to any disclaimer, the term of this patent is extended or adjusted under 35 U.S.C. 154(b) by 326 days.

(21) Appl. No.: 14/807,018

(22) Filed: Jul. 23, 2015

Related U.S. Application Data

(60) Provisional application No. 62/028,616, filed on Jul. 24, 2014.

(51) Int. Cl.
*B25J 13/08* (2006.01)
*B25J 19/02* (2006.01)
*B62D 57/032* (2006.01)
*G06N 3/00* (2006.01)

(52) U.S. Cl.
CPC .............. *B25J 13/08* (2013.01); *B25J 19/02* (2013.01); *B62D 57/032* (2013.01); *G06N 3/008* (2013.01); *Y10S 901/01* (2013.01); *Y10S 901/09* (2013.01)

(58) Field of Classification Search
CPC ........... B25J 13/00; B25J 13/08; B62D 57/02; B62D 57/032; G06N 3/008
See application file for complete search history.

(56) References Cited

U.S. PATENT DOCUMENTS

| | | | |
|---|---|---|---|
| 6,301,524 B1 | 10/2001 | Takenaka | |
| 6,969,965 B2 | 11/2005 | Takenaka | |
| 7,127,326 B2 | 10/2006 | Lewis | |
| 2005/0066397 A1* | 3/2005 | Hidai | B62D 57/032 700/245 |
| 2006/0058920 A1 | 3/2006 | Matsunaga | |
| 2009/0082879 A1* | 3/2009 | Dooley | B25J 9/1658 700/3 |
| 2009/0294187 A1* | 12/2009 | Lee | A63H 11/00 180/8.6 |
| 2011/0130925 A1* | 6/2011 | Oikawa | B60L 15/2036 701/41 |

(Continued)

*Primary Examiner* — Adam R Mott
(74) *Attorney, Agent, or Firm* — Honigman Miller Schwartz and Cohn LLP

(57) ABSTRACT

Examples method and devices for automatic gait transition are described herein. In an example embodiment, a computing system may identify gaits for the robotic device to perform in response to receiving an input for the robotic device to move at a velocity. The system may determine criteria for selecting a gait from the identified gaits for the robotic device to perform based on sensor data of the environment (e.g., slope and terrain) and based on the state of the robotic device. The system may modify the set of criteria based on prior operation of the robotic device in respective environments similar to the environment. Responsive to determining the criteria for selecting a gait, the computing system may determine whether the identified gaits include a gait that enables the robotic device to move at the velocity according to the set of criteria, and provide instructions to operate based on the determination.

19 Claims, 6 Drawing Sheets

(56) References Cited

U.S. PATENT DOCUMENTS

2012/0316784 A1* 12/2012 Chrysanthakopoulos ................. G01C 21/206
 701/519
2013/0310979 A1 4/2013 Herr
2015/0000068 A1* 1/2015 Tsuboi .................... A47L 9/009
 15/319

* cited by examiner

METHODS AND DEVICES FOR AUTOMATIC GAIT TRANSITION

GOVERNMENT RIGHTS

This invention was made with U.S. Government support under Contract No. HR0011-10-C-0025 awarded by DARPA. The Government may have certain rights with regard to the invention.

BACKGROUND

Unless otherwise indicated herein, the materials described in this section are not prior art to the claims in this application and are not admitted to be prior art by inclusion in this section.

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and more intuitive. As robotic systems become increasingly prevalent in numerous aspects of modern life, the need for efficient robotic systems becomes apparent. Therefore, a demand for efficient robotic systems has helped open up a field of innovation in actuators, movement, sensing techniques, as well as component design and assembly. Robotic systems are being expected to move and operate efficiently to perform new tasks and functions.

SUMMARY

Example embodiments may relate to a robotic device performing automatic gait transition. As an example robotic device navigates, the robotic device may be configured to transition between gaits (e.g., mechanics for enabling travel) automatically based on an analysis of the environment, operations of the robotic device, and the input including the request for transition. The robotic device may automatically select a particular gait based on parameters associated with the environment, the robotic device, or a combination, among others.

In one example, the present application describes a method. The method may comprise receiving, at a computing system of a robotic device in an environment, an input for the robotic device to move in the environment at a given velocity. The method may further include, responsive to receiving the input, identifying respective gaits of a plurality of gaits associated with the robotic device that enable the robotic device to move in the environment at the given velocity. The method may also include, responsive to identifying the respective gaits, determining a first set of operation criteria for selecting a gait from the respective gaits for the robotic device to perform. In some instances, the first set of operation criteria may be based on sensor data indicative of a plurality of parameters of the environment, and the plurality of parameters may include respective parameters indicative of a slope and roughness of the environment. Additionally, the method may include modifying the first set of operation criteria based on prior operation of the robotic device in respective environments that have parameters substantially similar to the plurality of parameters of the environment of the robotic device. Further, the method may also include determining a second set of operation criteria for selecting the gait from the respective gaits for the robotic device to perform. The second set of operation criteria may be based on a state of the robotic device indicative of both respective operation of extendable legs of the robotic device and an internal state indicative of a point of operation of a current gait of the robotic device. In addition, the method may include, responsive to determining both the modified first set of operation criteria and the second set of operation criteria, determining whether the respective gaits include a given gait that enables the robotic device to move in the environment at the given velocity according to the modified first set of operation criteria and the second set of operation criteria. The method may also include, based on determining that the respective gaits include the given gait that enables the robotic device to move in the environment at the given velocity, providing instructions to one or more systems of the robotic device to perform the given gait.

In another example, the present application describes a system comprising at least one processor. The system may also comprise a memory having stored thereon executable instructions that, upon execution by the at least one processor, cause the system to perform functions comprising receiving an input for a robotic device to move in an environment at a given velocity. Additionally, the functions may include, responsive to receiving the input, identifying respective gaits of a plurality of gaits associated with the robotic device that enable the robotic device to move in the environment at the given velocity. The functions may also include, responsive to identifying the respective gaits, determining a first set of operation criteria for selecting a gait from the respective gaits for the robotic device to perform. The first set of operation criteria may be based on sensor data indicative of a plurality of parameters of the environment, and the plurality of parameters may include respective parameters indicative of a slope and roughness of the environment. The functions may include modifying the first set of operation criteria based on prior operation of the robotic device in respective environments that have parameters substantially similar to the plurality of parameters of the environment of the robotic device. The functions may also include determining a second set of operation criteria for selecting the gait from the respective gaits for the robotic device to perform. The second set of operation criteria may be based on a state of the robotic device indicative of both respective operation of extendable legs of the robotic device and an internal state indicative of a point of operation of a current gait of the robotic device. The functions may also include, responsive to determining both the modified first set of operation criteria and the second set of operation criteria, determining whether the respective gaits include a given gait that enables the robotic device to move in the environment at the given velocity according to the modified first set of operation criteria and the second set of operation criteria. Additionally, the functions may further include, based on determining that the respective gaits include the given gait that enables the robotic device to move in the environment at the given velocity, providing instructions to one or more systems of the robotic device to perform the given gait.

In another example, the present application describes a non-transitory computer readable medium having stored thereon executable instructions that, upon execution by a computing device, cause the computing device to perform functions. The functions may comprise receiving an input for a robotic device to move in an environment at a given velocity and responsive to receiving the input, identifying respective gaits of a plurality of gaits associated with the robotic device that enable the robotic device to move in the environment at the given velocity. Additionally, the functions may comprise, responsive to identifying the respective gaits, determining a first set of operation criteria for selecting a gait from the respective gaits for the robotic device to perform. The first set of operation criteria may be based on sensor data indicative of a plurality of parameters of the environment and the plurality of parameters may include respective parameters indicative of a slope and roughness of the environment. The functions may include modifying the first set of operation criteria based on prior operation of the robotic device in respective environments that have parameters substantially similar to the plurality of parameters of the environment of the robotic device and determining a second set of operation criteria for selecting the gait from the respective gaits for the robotic device to perform. The second set of operation criteria may be based on a state of the robotic device indicative of both respective operation of extendable legs of the robotic device and an internal state indicative of a point of operation of a current gait of the robotic device. The functions may include, responsive to determining both the modified first set of operation criteria and the second set of operation criteria, determining whether the respective gaits includes a given gait that enables the robotic device to move in the environment at the given velocity according to the modified first set of operation criteria and the second set of operation criteria. The functions may also include, based on determining that the respective gaits include the given gait that enables the robotic device to move in the environment at the given velocity, providing instructions to one or more systems of the robotic device to perform the given gait.

These as well as other aspects, advantages, and alternatives, will become apparent to those of ordinary skill in the art by reading the following detailed description, with reference where appropriate to the accompanying figures.

DETAILED DESCRIPTION

Figure 1:
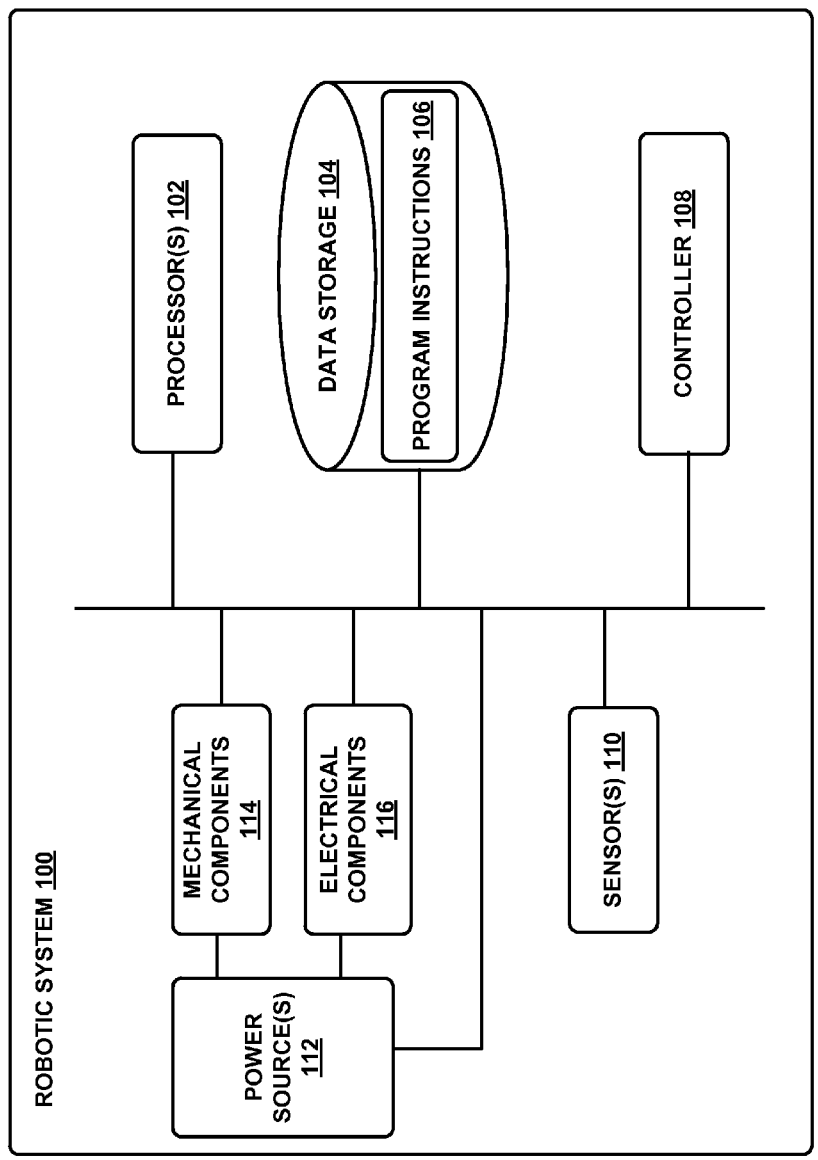
FIG. 1 illustrates an example configuration of a robotic system.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Robotic devices may perform various functions including having the ability to travel at a range of velocities (or speeds in general) using different techniques (e.g., gaits) dependent on the design of the robotic device operating. A robotic device may transition between operations, which may include transitioning between different gaits to alter velocity or the mechanics enabling movement. A gait represents mechanics a robotic device may perform to move at a desired speed and direction. During navigation, prior to performing a particular gait or changing the current performance of a gait (e.g., increasing speed), a computing system assisting in the operation of a robotic device may consider a variety of factors to determine whether to enable the robotic device to perform the transition. By considering factors, the computing system may perform an analysis to prevent transitioning the robotic device to perform an operation that may cause the robotic device to fail. Examples factors, also described herein as operation criteria or criteria, may be based on the environment of the robotic device, parameters associated with the input requesting the transition, and/or the current state of the robotic device, among others. The computing system may consider the factors to assist in selecting an appropriate gait to accomplish a desired goal that may have been received within an input or to determine whether transitioning to a particular gait is possible, including whether performing the particular gait is safe and efficient.

Further, in some instances, the computing system of the robotic device may use the factors to select a gait or similar operation that is optimal for the current circumstances of the robotic device and/or further performance parameters for the control systems of the robotic device to utilize when executing the gait (e.g., speed for operating the gait). The selection factors may also impact other operations determined by the computing system, such as operations relating to transitioning between gaits.

In some instances, the environment of the robotic device may directly or indirectly impact the ability for the robotic device to travel and operate. Environments having harsh conditions for travel may cause the computing system of a robotic device to select a gait or other operation that enables the robotic device to properly move. For example, environments with a rocky terrain, lots of slopes, areas of water and/or other parameters may require a robotic device to transition between gaits to move throughout the environment. As such, the robotic device may utilize automatic gait transition techniques to switch between gaits with mechanics that may enable the robotic device to operatively adapt to the environment.

Additionally, the computing system may factor the state of the robotic device prior to transitioning the robotic device into a given gait. As one example illustration, the computing system may factor the current speed of the robotic device prior to transitioning the robotic device into a particular gait. Similarly, the computing system may also factor the current point of operation of the robotic device when providing instructions for travel for the robotic device. The computing system may further develop criteria for selecting a gait for the robotic device to perform based on past performances of the robotic device. The computing system may develop factors to consider based on performances by the robotic device in similar environments to the current environment of the robotic device.

In one example embodiment, the computing system of an example robotic device may receive input(s) that signal the robotic device to perform an operation, such as traveling in a direction or to a particular destination in the environment. The computing system may receive the input(s) from a variety of sources, including but not limited to, a system of the robotic device (e.g., navigation system) or from a user through communication interface of the robotic device. The input(s) may include additional information for the computing system, such as a direction, velocity, and/or duration, etc., for the robotic device to operate by when performing a function provided in the input. In response to receiving an input, the computing system may process the input to identify gaits that the robotic device may perform to fulfill the input. In some examples, the computing system may identify multiple gaits that the robotic device may perform to accomplish the parameters included within the input (e.g., move in the direction and speed provided within the input).

Further, in some instances, the computing system may be configured to automatically consider all the gaits that the robotic device is designed to perform prior to selecting a gait to perform. In other examples, the computing system of the robotic device may select from a set of gaits, which may involve selecting from a set of the recently performed gaits according to the current location of the robotic device as indicated by a global positioning system (GPS), for example.

Prior to automatically transitioning the robotic device into performing one of the identified gaits, the computing system may analyze the environment to develop a first set of operation criteria to utilize to select a gait from the identified gaits that may assist the computing system in determining a gait that operates properly in the current environment of the robotic device. The robotic device may be equipped with a sensor system that includes a variety of sensors for measuring the environment. Based on incoming sensor data, the robotic device may determine the set of criteria for the environment to assist with determining a proper gait for that enables the robotic device to travel through the different elements of the present environment.

Different environments may result in variations among sets of criteria based on the parameters of the environments, including criteria corresponding to terrain of the environment (e.g., roughness, slope), the amount and location of nearby obstacles, and/or other environmental elements. For example, a rocky terrain may cause the computing system to determine a set of criteria that differs from the set of criteria determined from a smooth terrain. Through analyzing the identified gaits available to the robotic device with the set of criteria corresponding to the environment of the robotic device, the computing system may prevent switching the robotic device to a gait that may not be performed efficiently or properly in a given environment. As described, the computing system may actively determine a gait that the robotic device may properly perform according the different parameters of the surrounding environment.

In some instances, the computing system may additionally modify the set of criteria using stored information that expresses how the robotic device performed in environments having similar parameters (e.g., related criteria). This way, the computing system may prevent switching to a gait that the robotic device may have unsuccessfully attempted in a similar environment. Using multiple past performances of the robotic device, the computing system may create additional factors to consider prior to enabling the robotic device to switch to a gait. The computing system may also modify the set of criteria corresponding to the environment to consider based on prior sensor data of the environment and/or maps of the environment for example.

Further, in some example implementations, the computing system may also determine a second set of operation criteria for selecting the gait for the robotic device to perform based on a state of the robotic device. In particular, the computing system may receive data that expresses the state of the robotic device, which may be indicative of operation of mechanical features (e.g., extendable legs) of the robotic device. Similarly, the state of the robotic device may be based on other information, such as an internal state of the robotic device that indicates the current point of operation of a current gait of the robotic device. The internal state of the robotic device may enable the computing system to determine whether the robotic device is currently able to switch to a selected gait. In one example embodiment, the computing system of a robotic device may use a set of criteria developed based on the robotic device to select a gait for the robotic device to perform without considering any parameters of the environment.

As result of developing criteria to use to select a proper gait, the computing system may determine whether the previously identified gaits include one or multiple gaits that satisfies the criteria (e.g., capable of switching to and performing the gait at the desired speed in the environment). The computing system may utilize the criteria as an "all or nothing" determination, for example, which may involve the computing system requiring an identified gait to satisfy all the requirements set forth in the criteria based on the environment and the state of the robotic device prior to providing instructions to systems of the robotic device to perform the gait. This way, the computing system may prevent switching the robotic device to a gait that may be unsuitable for the environment or cause an improper transition from the current state of the robotic device.

Similarly, the computing system may analyze the gaits with criteria to determine whether a gait or gaits fall within thresholds necessary for the transition. Using this analysis, the computing system may weigh strengths against weaknesses of selecting a particular gait to perform in the environment with the current state of the robotic device. Additionally, within other example embodiments, the computing system may use other techniques to determine whether to transition the robotic device to perform a gait as well.

After determining a gait suited for operation in the environment and a proper transition, the computing system may provide instructions to systems of the robotic device (e.g., a control system) to operate the robotic device. In some instances, the computing system may determine that the environment does not allow the robotic device to properly travel and may provide the systems with instructions that do not correspond to the input (e.g., stop or travel in another direction). The computing system may also provide instructions that include delays, speed to operate, steps for transitioning, or other information. In some cases, the computing system may also determine more inputs are necessary to determine the next navigational action for the robotic device. Other examples of instructions may exist as well.

Furthermore, in another example embodiment, the computing system of a robotic device may use more or less factors for considering whether or not to transition of a robotic device to perform a gait. The computing system may consider the level of power available of the robotic device to determine whether to switch to perform some gaits that may require more power than others. Similarly, a robotic device may use a similar process to determine whether to transition to a higher and/or lower speed, for example. In some instances, a robotic device may factor other considerations prior to automatically transitioning to a new technique of movement.

Referring now to the figures, FIG. 1 illustrates an example configuration of a robotic system. The robotic system 100 represents an example robotic system configured to perform the methods described herein. Additionally, the robotic system 100 may be configured to operate autonomously, semi-autonomously, and/or using directions provided by user(s), and may exist in various forms, such as a humanoid robot or a quadruped robot, among other examples. Furthermore, the robotic system 100 may also be referred to as a robotic device, mobile robot, or robot, among others.

As shown in FIG. 1, the robotic system 100 includes processor(s) 102, data storage 104, program instructions 106, controller 108, sensor(s) 110, power source(s) 112, mechanical components 114, and electrical components 116. Note that the robotic system 100 is shown for illustration purposes as robotic system 100 and may include more or less components within examples without departing from the scope of the invention. The various components of robotic system 100 may be connected in any manner, including wired or wireless connections, etc. Further, in some examples, components of the robotic system 100 may be positioned on multiple entities rather on a single entity. Other example illustrations of robotic system 100 may exist as well.

Processor(s) 102 may operate as a general-purpose processor or a special purpose processor (e.g., digital signal processors, application specific integrated circuits, etc.). The processor(s) 102 can be configured to execute computer-readable program instructions 106 that are stored in the data storage 104 and are executable to provide the functionality of the robotic system 100 described herein. For instance, the program instructions 106 may be executable to provide functionality of controller 108, where the controller 108 may be configured to cause activation and deactivation of the mechanical components 114 and the electrical components 116. The processor(s) 102 may operate and enable the robotic system 100 to perform various functions, including the functions described herein.

The data storage 104 may exist as various types of storage configured to hold memory. For example, the data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some embodiments, the data storage 104 can be implemented using a single physical device (e.g., one optical, magnetic, organic or other memory or disc storage unit), while in other embodiments, the data storage 104 can be implemented using two or more physical devices, which may communicate via wired or wireless communication. Further, in addition to the computer-readable program instructions 106, the data storage 104 may include additional data such as diagnostic data, among other possibilities.

The robotic system 100 includes at least one controller 108, which may interface with the robotic system 100. The controller 108 may serve as a link between portions of the robotic system 100, such as a link between mechanical components 114 and/or electrical components 116. In some instances, the controller 108 may serve as an interface between the robotic system 100 and another computing device. Further, the controller 108 may serve as an interface between the robotic system 100 and a user(s). The controller 108 may include various components for communicating with the robotic system 100, including a joystick(s), buttons, among others. The controller 108 may perform other functions for the robotic system 100 as well. Other examples of controllers may exist as well.

Additionally, the robotic system 100 includes one or more sensor(s) 110 such as force sensors, proximity sensors, motion sensors, load sensors, position sensors, touch sensor, depth sensors, ultrasonic range sensors, and infrared sensors, among other possibilities. The sensor(s) 110 may provide sensor data to the processor(s) 102 to allow for appropriate interaction of the robotic system 100 with the environment as well as monitoring of operation of the systems of the robotic system 100. The sensor data may be used in evaluation of various factors for activation and deactivation of mechanical components 114 and electrical components 116 by controller 108 and/or a computing system of the robotic system 100.

The sensor(s) 110 may provide information indicative of the environment of the robotic device for the controller 108 and/or computing system to use to determine operations for the robotic system 100. For example, the sensor(s) 110 may capture data corresponding to the terrain of the environment or location of nearby objects, which may assist with environment recognition and navigation, etc. In one example configuration, the robotic system 100 may include a sensor system that includes RADAR, LIDAR, a global positioning system (GPS), and/or other sensors for capturing information of the environment of the robotic system 100. The sensor(s) 110 may monitor the environment in real-time and detect obstacles, elements of the terrain, weather conditions, temperature, and/or other parameters of the environment for the robotic system 100.

Further, the robotic system 100 may include other sensor(s) 110 configured to receive information indicative of the state of the robotic system 100, including sensor(s) 110 that may monitor the state of the various components of the robotic system 100. The sensor(s) 110 may measure activity of systems of the robotic system 100 and receive information based on the operation of the various features of the robotic system 100, such the operation of extendable legs, arms, or other mechanical and/or electrical features of the robotic system 100. The sensor data provided by the sensors may enable the computing system of the robotic system 100 to determine errors in operation as well as monitor overall functioning of components of the robotic system 100. For example, the computing system may use sensor data to determine a stability of the robotic system 100 during operations as well as measurements related to power levels, communication activities, components that require repair, among other information. As one example configuration, the robotic system 100 may include gyroscope(s), accelerometer(s), stereo or general vision systems, and/or other possible sensors to provide sensor data relating to the state of operation of the robotic device. Further, sensor(s) 110 may also monitor the current state of a function, such as a gait, that the robotic system 100 may currently be operating. Other example uses for the sensor(s) 110 may exist as well.

Additionally, the robotic system 100 may also include one or more power source(s) 112 configured to supply power to various components of the robotic system 100. Among possible power systems, the robotic system 100 may include a hydraulic system, electrical system, batteries, and/or other types of power systems. As an example illustration, the robotic system 100 may include one or multiple batteries configured to provide charge to components that may receive charge via a wired and/or wireless connection. Within examples, components of the mechanical components 114 and electrical components 116 may each connect to a different power source or may be powered by the same power source. Components of the robotic system 100 may connect to multiple power sources 112 as well.

Within example configurations, any type of power source may be used to power the robotic system 100, such as a gasoline engine. Further, the power source(s) 112 may charge using various types of charging, such as wired connections to an outside power source, wireless charging, combustion, or other examples. Other configurations may also be possible. Additionally, the robotic system 100 may include a hydraulic system configured to provide power to the mechanical components 114 using liquid fluid power. Components of the robotic system 100 may operate based on hydraulic fluid being transmitted throughout the hydraulic system to various hydraulic motors and hydraulic cylinders, for example. The hydraulic system of the robotic system 100 may transfer a large amount of power through small tubes, flexible hoses, or other links between components of the robotic system 100. Other power sources may be included within the robotic system 100 within examples.

Mechanical components 114 represent possible hardware of the robotic system 100 that may enable the robotic system 100 to operate and perform physical functions. As a few examples, the robotic system 100 may include actuator(s), extendable leg(s) ("legs"), arm(s), wheel(s), one or multiple structured bodies for housing the computing system or other components, and other mechanical components. The mechanical components 114 may depend on the design of the robotic system 100 and may also be based on the functions and/or tasks the robotic system 100 may be configured to perform. As such, depending on the operation and functions of the robotic system 100, different mechanical components 114 may be available for the robotic system 100 to utilize. In some examples, the robotic system 100 may be configured to add and/or remove mechanical components 114, which may involve assistance from a user and/or other robotic device. For example, the robotic system 100 may be initially configured with four legs, but may altered by a user or the robotic system 100 to remove two of the four legs to operate as a biped. Other examples of mechanical components 114 may be included within some embodiments.

The electrical components 116 may include various components capable of processing, transferring, providing electrical charge or electric signals, for example. Among possible examples, the electrical components 116 may include electrical wires, circuitry, and/or wireless communication transmitters and receiver to enable operations of the robotic system 100. The electrical components 116 may interwork with the mechanical components 114 to enable the robotic system 100 to perform various functions. The electrical components 116 may be configured to provide power from the power source(s) 112 to the various mechanical components 114, for example. Further, the computing system 100 may include electric motors. Other examples of electrical components 116 may exist as well.

Figure 2:
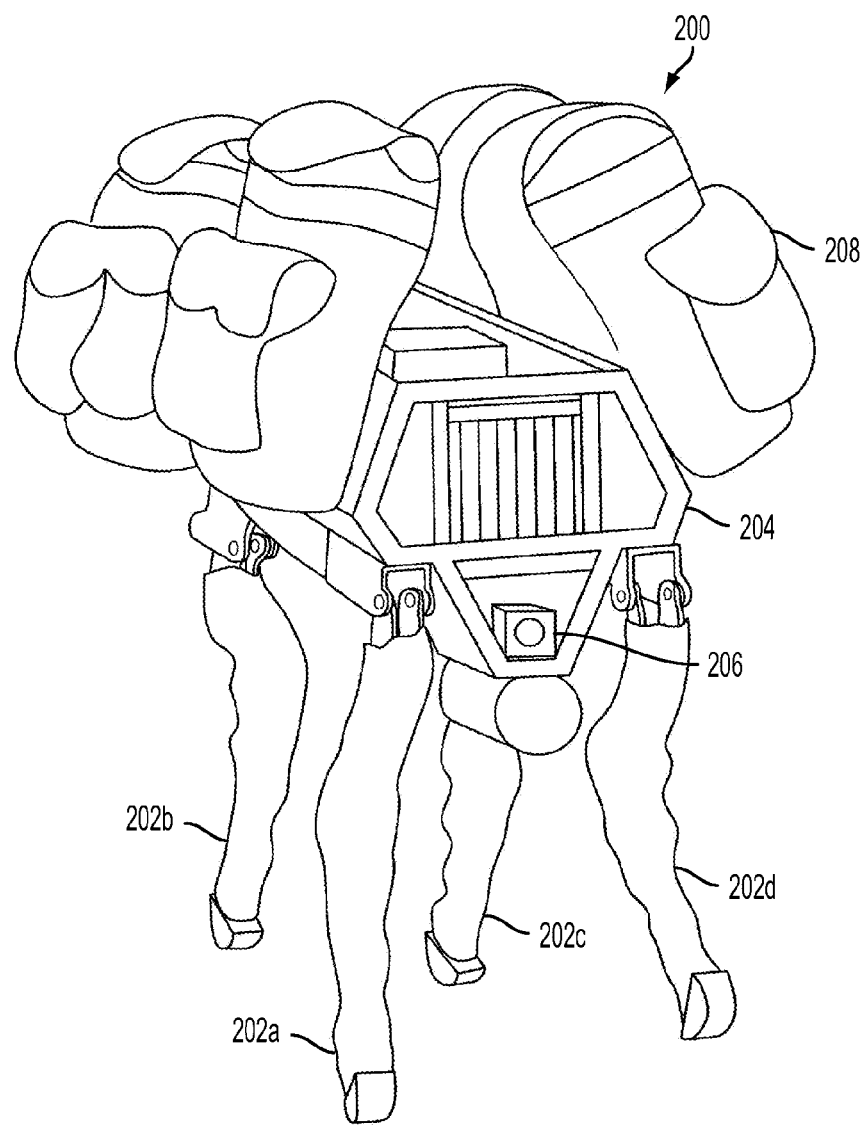
FIG. 2 illustrates a quadruped robot, according to an example embodiment.

FIG. 2 illustrates a quadruped robot, according to an example embodiment. Among other possible functions, the robotic device 200 may be configured to perform the methods described herein during operation. The robotic device 200 includes legs 202a-202d connected to a body 204 of the robotic device 200 and may also include sensors (e.g., sensor 206) configured to provide sensor data to a computing system of the robotic device 200. Further, the robotic device 200 is illustrated carrying objects 208 on the body 204. Within other example implementations, the robotic device 200 may include more or less components and may additionally include components not shown in FIG. 2.

The robotic device 200 may be a physical representation of the robotic system 100 shown in FIG. 1 or may be based on other configurations. To operate, the robotic device 200 includes a computing system that be made up of one or multiple computing devices configured to assist in various operations of the robotic device 200, which may include processing data and providing outputs based on the data. The computing system may process information provided by various systems of the robotic device 200 (e.g., sensor system) or from other sources (e.g., a user, another robotic device, a server) and may provide instructions to the systems to operate in response.

Additionally, the computing system may monitor systems of the robotic device 200 during operation, which may be to watch for errors and/or monitor regular operation, for example. In some example configurations, the computing system may serve as a connection between the various systems of the robotic device 200 that coordinates the operations of the systems together to enable the robotic device 200 to perform functions. Further, although the operations and methods described herein correspond to a computing system of a robotic device performing tasks, the computing system may be made of multiple devices, processors, controllers, and/or other entities configured to assist in the operation of the robotic device. Additionally, the computing system may operate using various types of memory and/or other components.

The robotic device 200 exists as a quadruped robotic device with four extendable legs 202a-202d also described herein as extendable legs. Although the robotic device 200 includes four legs 202a-202d in the illustration shown in FIG. 2, the robotic device 200 may include more or less legs within other examples. Further, the configuration, position, and/or structure of the legs 202a-202d may vary in example implementations. The legs 202a-202d enable the robotic device 200 to move and may be configured to operate in multiple degrees of freedom to enable different techniques of travel to be performed. In particular, the legs 202a-202d may enable the robotic device 200 to travel at various speeds through mechanically controlling the legs 202a-202d according to the mechanics set forth within different gaits. A gait is a pattern of movement of the limbs of animal, robotic device, or other mechanical structure. As such, the robotic device 200 may navigate by operating the legs 202a-202d to perform various gaits that the robotic device 200 is configured to perform. The robotic device 200 may use a variety gaits to travel within an environment, which may involve selecting a gait based on speed, terrain, the need to maneuver, and/or energy efficiency. The robotic device 200 may be configured to switch between performing gaits, which may enable the robotic device to change speeds or the mechanics of operating the legs 202a-202d.

Further, different types of robotic devices may use different gaits due to differences in design that may prevent use of certain gaits. Although some gaits may have specific names (e.g., stand, walk, job, gallop, bound), the distinctions between gaits may overlap with some gaits having slight variations. The gaits may be classified based on footfall patterns, also known as the locations on the surface for the placement of distal ends of the extendable legs (e.g., feet). Similarly, gaits may also be classified based on mechanics. One or multiple systems of the robotic device 200, such as a control system, may be configured to operate the legs 202a-202d to cause the robotic device to move. Additionally, the robotic device 200 may include other mechanical apertures, which may be attached to the robotic device 200 at various positions. The robotic device 200 may include mechanical arms, grippers, wheels, or other features. The legs 202a-202d may have feet or other type of mechanical features that enables control upon various types of surfaces that the robotic device may encounter, such as wheels, etc.

As part of the design of the example robotic device 200, the body 204 of the robotic device 200 connects to the legs 202a-202d and may house various components of the robotic device 200. As such, the structure of the body 204 may vary within examples and may further depend on particular functions that a given robotic device may have been designed to perform. For example, a robotic device developed to carry heavy loads may have a wide body that enables placement of the load. Similarly, a robotic device designed to reach high speeds may have a narrow, small body that does not have substantial weight. Further, the body 204 as well as the legs 202 may be developed using various types of materials, such as various metals or plastics. Within other examples, a robotic device may have a body with a different structure or made of other types of materials.

The sensor(s) 206 of the robotic device 200 may include various types of sensors, such as the camera or sensing system shown in FIG. 2. The sensor(s) 206 is positioned on the front of the body 204, but may be placed at other positions of the robotic device as well. As described for the robotic system 100, the robotic device 200 may include a sensory system that includes RADAR, LIDAR, GPS, stereo or general vision systems, accelerometer(s), gyroscope(s), and/or other types of sensors. The sensor(s) 206 may be configured to measure parameters of the environment of the robotic device 200 as well as monitor internal operations of systems of the robotic device 200. As one example illustration, the robotic device 200 may include sensors that monitor the accuracy of its systems to enable the computing system to detect any system within the robotic device 100 that may be operating incorrectly. Other uses of the sensor(s) 206 may be included within examples.

The objects 208 carried by the robotic device 200 may represent various types of cargo that the robotic device 200 may transport. The objects 208 may represent external batteries or other types of power sources (e.g., solar panels) that the robotic device 200 may utilize. The objects 208 represent one example use the robotic device 200 may be configured for. As such, the robotic device 200 may be configured to perform other functions and/or operations as well.

Additionally, as shown with the robotic system 100, the robotic device 200 may also include various electrical components that may enable operation and communication between the mechanical features of the robotic device 200. As previously indicated, the robotic device 200 may include one or multiple computing systems that include one or multiple processors configured to perform various functions, including processing inputs to provide outputs. The computing system may include additional components, such as various types of storage and a power source, etc.

In some example embodiments, during operation, the computing system may communicate with other systems of the robotic device 200 via wired or wireless connections and may further be configured to communicate with one or multiple users of the robotic device. As one possible illustration, the computing system may receive an input from a user indicating that the user wants the robotic device to perform a particular gait in a given direction. The computing system may process the input and may perform a process that may cause the systems of the robotic device to perform the requested gait. Additionally, the robotic device's electrical components may include other type of electrical components, including but not limited to interface, wires, busses, and/or other communication links configured to enable systems of the robotic device to communicate.

Furthermore, the robotic device 200 may communicate with one or multiple users and/or other robotic devices via various types of interface. In one example embodiment, the robotic device 200 may receive input from a user via a joystick or similar type of interface. The computing system may be configured to measure the amount of force and other possible information from inputs received from a joystick interface. Similarly, the robotic device 200 may receive inputs and communicate with a user via other types of interface, such as a mobile device or a microphone. The computing system of the robotic device 200 may be configured to process the various types of inputs that the robotic device 200 may receive.

Figure 3:
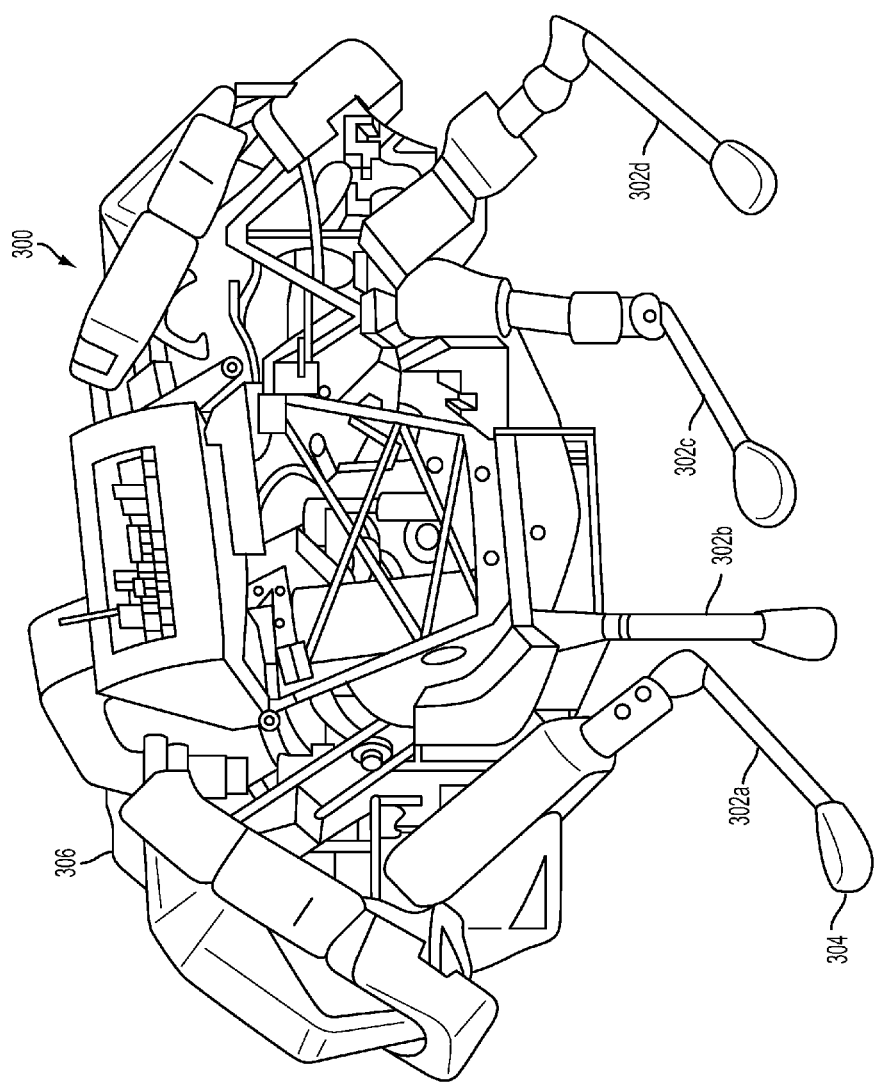
FIG. 3 illustrates another example quadruped robot.

FIG. 3 illustrates another example quadruped robot. Similar to robotic device 200 shown in FIG. 2, the robotic device 300 may be configured to operate according to the methods described herein. As shown in FIG. 3, the robotic device 300 includes legs 302a-302d that are configured with feet (e.g., foot 304) positioned on the distal ends of the legs 302a-302d that land and push off the surface of the environment. Additionally, the legs 302a-302d are connected to the body 306 of the robotic device 300. In some instances, the robotic device 300 may include additional components not illustrated herein. Like the robotic device 200 shown in FIG. 2, the robotic device 300 may be configured to operate autonomously, semi-autonomously, and/or may operate based on commands from a user. Likewise, the robotic device 300 may have a computing system that processes data and assists in the operations of the robotic device 300.

The robotic device 300 shown in FIG. 3 is a quadruped (i.e., has four legs 302a-302d), but may include more or less legs within other examples. The legs 302a-302d may enable the robotic device 300 to move throughout different environments and may be mechanically configured to perform different gaits. During operation, the legs 302a-302d may receive power from one or multiple types of power sources within the robotic device 300. For example, the legs 302a-302d may operate using power provided by a hydraulic system of the robotic device 300. Additionally, as illustrated in FIG. 3, the legs 302a-302d may include feet (e.g., foot 304) positioned on the end of the legs. The feet may serve to generate traction for the robotic device 300 as the robotic device 300 traverses an environment. The feet may take various forms and may assist stabilize the robotic device 300 during operation. Further, the robotic device 300 may configure the placement or land spots of the feet on the surface of the environment to manipulate travel.

The legs 302a-302d are connected to the body 306 of the robotic device 300, which may be configured to hold and protect various computing components and/or other components of the robotic device 300. The body 306 of robotic device 300 has a structure that differs from the body 204 of the robotic device 200 shown in FIG. 2 and may differ within other examples. The structure of the body 306 may be configured based on the design and functions of the robotic device 300. Other examples may exist as well.

Furthermore, the robotic device 300 may include a sensor system including various types of sensors configured to provide the computing systems of the robotic device 300 with information to assist in operation. The sensors may monitor the surrounding environment of the robotic device and/or may provide information to the computing system relating to the performance of various systems of the robotic device 300. The sensor system may include a variety of sensors configured to monitor the state of the robotic device 300 as well as the environment of the robotic device 300, among others. Additionally, the robotic device 300 may include other systems, such as a navigation system, control system, and/or other type of systems.

In one example embodiment, the robotic device 300 may receive inputs from a user via one or multiple types of interface, such as a remote controller with a joystick or a mobile phone. The robotic device 300 may include other components that enable communication with user(s), other robotic devices, and/or other entities. For example, the robotic device 300 may include transmitters and/or receivers for enabling communication. Additionally, in other example embodiments, a robotic device may include additional features, such as wheels, mechanical arms, etc. The additional features may assist the robotic device 300 perform various tasks. As on example illustration, the robotic device 300 may include wheels that may provide another means of travel for the robotic device 300.

Figure 4:
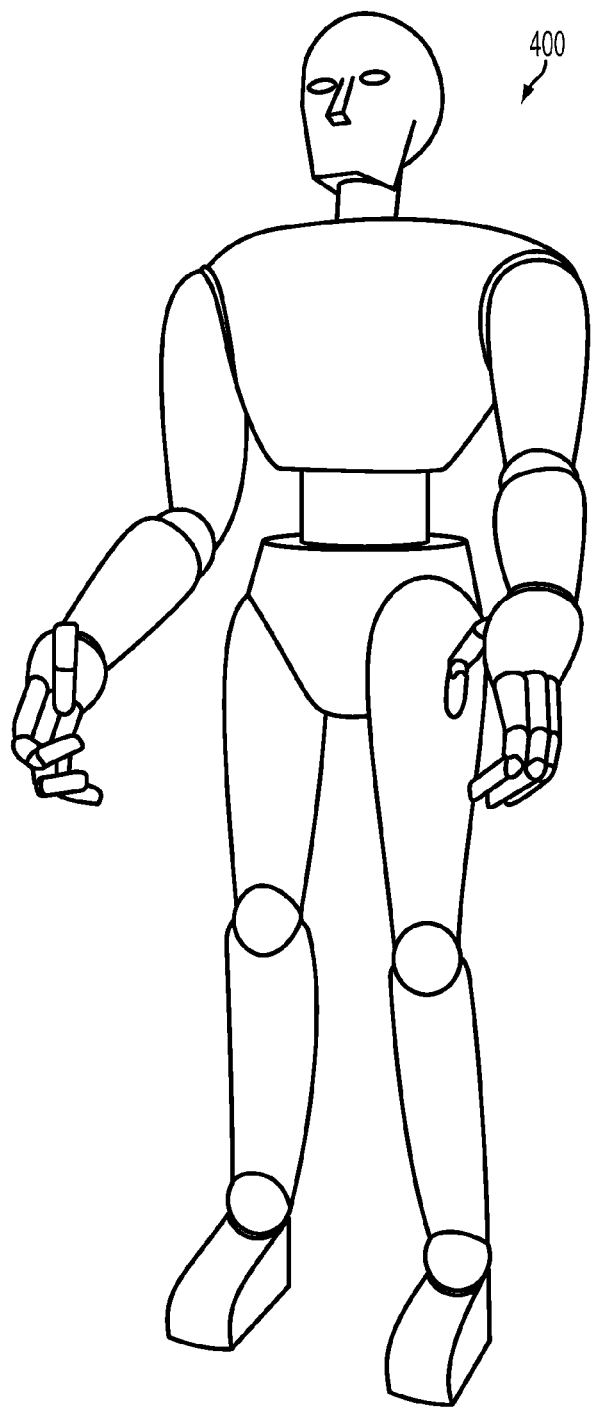
FIG. 4 illustrates a biped robot, according to an example embodiment.

FIG. 4 illustrates a biped robot, according to an example embodiment. Similar to robotic device 200 and robotic device 300, robotic device 400 may correspond to the robotic system 100 shown in FIG. 1, and may be configured to perform some of the implementations described herein. Thus, robotic device 400 may include one or more of mechanical components, sensor(s), power source(s), electrical components, and/or control system.

For example, the robot device 400 may include legs connected to a body. Each leg may consist of one or more members connected by joints and configured to operate with various degrees of freedom with respect to one another. Each leg may also include a respective foot, which may contact a surface (e.g., the ground surface). The legs may enable the robotic device 400 to travel at various velocities and/or acceleration levels according to the mechanics set forth within gaits. The robotic device 400, however, may utilize different gaits from that of the robotic device 200 and robotic device 300, due at least in part to the differences between biped and quadruped capabilities.

The robotic device 400 may also include arms, which may facilitate object manipulation, load carrying, and/or balancing for the robotic device 400. Like the legs, each arm may consist of one or more members connected by joints and configured to operate with various degrees of freedom with respect to one another. Each arm may also include a respective hand. The robotic device 400 may use the hands for gripping, turning, pulling, and/or pushing objects. The hands may include various types of appendages or attachments, such as fingers, grippers, welding tools, cutting tools, and so on.

The robotic device 400 may also include sensor(s), which may be configured to provide sensor data to its control system. In some cases, the locations of these sensors may be chosen in order to suggest an anthropomorphic structure of the robotic device 400. Thus, as illustrated in FIG. 4, the robotic device 400 may contain vision sensors (e.g., cameras, infrared sensors, object sensors, range sensors, etc.) within its head.

Figure 5:
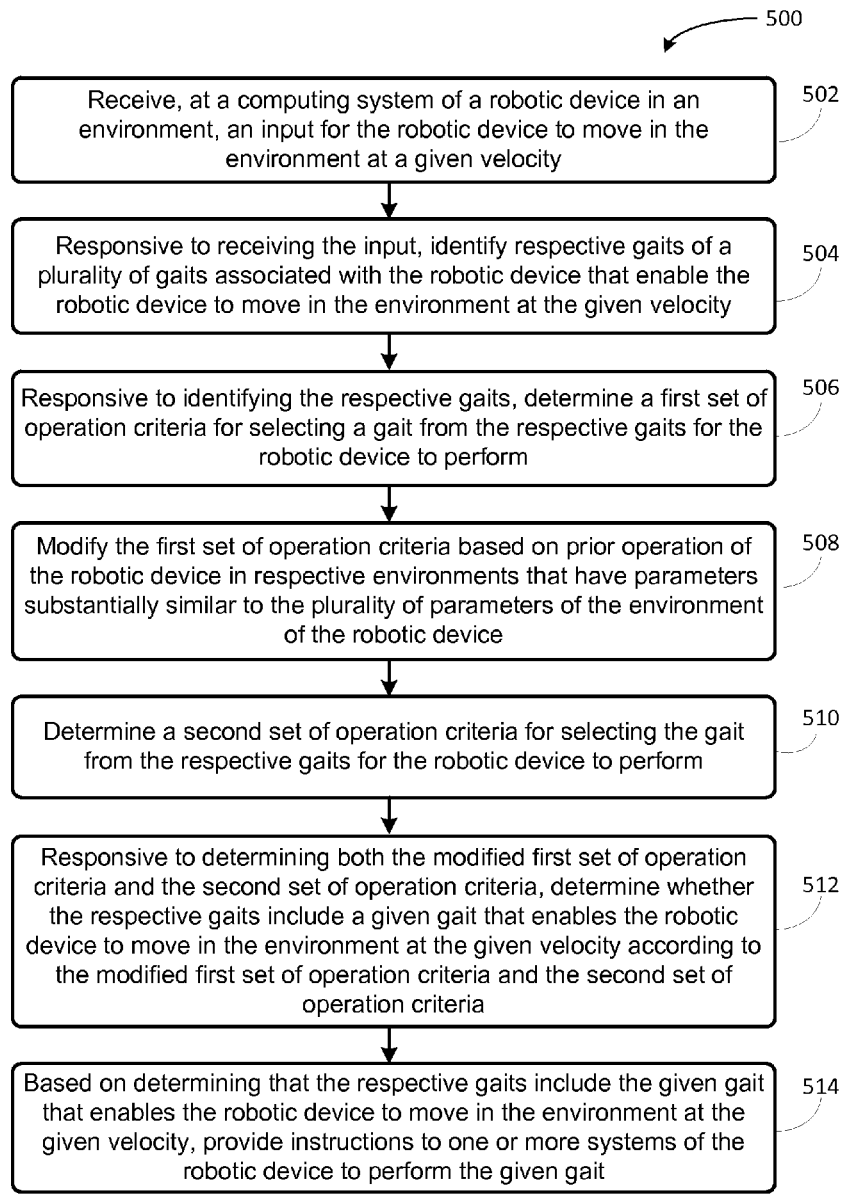
FIG. 5 is a flowchart for automatic gait transition, according to an example embodiment.

FIG. 5 is a flowchart for automatic gait transition, according to an example embodiment. The method 500 may include one or more operations, functions, or actions as illustrated by one or more blocks 502-514. Although the blocks are illustrated in a sequential order, these blocks may, in some instances, be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

The non-transitory computer readable medium could also be distributed among multiple data storage elements, which could be remotely located from each other. A computing device or system that executes some or all of the stored instructions could be any type of robotic device capable of performing one or multiple gaits, such as the example robotic device 200, robotic device 300, and/or robotic device 400. Alternatively, the computing device or system that executes some or all of the stored instructions could be another computing device or system, such as a server.

In addition, for the method 500 and other processes and methods disclosed herein, each block in FIG. 5 may represent circuitry that is wired to perform the specific logical functions in the process. Example methods, such as method 500 of FIG. 5 may be carried out in whole or in part by the robotic device and its subsystems. Accordingly, example methods could be described by way of example herein as being implemented by the robotic device. The robotic device may be autonomous, partially autonomous, or controlled completely by a user, for example. However, it should be understood that an example method may be implemented in whole or in part by other computing devices of the robotic device or separate from the robotic device. For example, an example method may be implemented in whole or in part by a server system, which receives data from a device such as those associated with the robotic device.

At block 502, the method 500 may include receiving, at a computing system of a robotic device in an environment, an input for the robotic device to move in the environment at a given velocity. An example robotic device performing the method 500 or similar methods may receive, at a computing system, input(s) to perform particular operations, such as navigational requests or commands. The inputs may specify velocity with a desired direction, general speed, operation (e.g., gait), and/or additional information for the robotic device.

As previously shown with the robotic devices described in FIGS. 1-4, the robotic device may travel by using gaits, which each may describe different mechanical cyclical positions for operating features of the robotic device (e.g., legs) to travel. The different gaits may enable the robotic device to travel at different speeds using certain mechanics, and/or foot patterns. In addition to gaits, the robotic device may perform other operations, which may include sequence of movements between gaits. As one example illustration, the robotic device may fall over and include one or multiple functions for performing to get back up and continue performing a task. Other examples may exist as well.

During operation, the computing system (e.g., a plurality of computing devices) of the robotic device may receive and process inputs provided to the robotic device by various sources. The computing system may receive inputs in real-time from systems of the robotic device that enable the robotic device to operatively adapt to the environment and/or changes in system operation. Among possible incoming data, the computing system may receive inputs from a sensor system of the robotic device indicative of parameters of the environment and/or operation of systems and mechanical features of the robotic device (e.g., a state of the robotic device). Similarly, the robotic device may receive information and inputs from other sources, such as from users or other robotic devices through various forms of interface that the robotic device may include.

The input(s) provided to the computing system by various sources may indicate different operations for the robotic device to perform. In some instances, an input may represent a desired destination for the robotic device to travel to. Likewise, an input may specify a change in the current operation, such as increasing or decreasing speed, stopping operation, and/or changing the current gait of the robotic device, among other possibilities. The computing system of the robotic device may process incoming inputs to determine proper outputs, which may include determining functions that the robotic device may perform as a result of one or multiple inputs. Upon receiving an input, the computing system may process the input to determine proper operation for the robotic device. In one example embodiment, the computing system of the robotic device may accumulate multiple inputs prior to determining a proper operation for the robotic device to perform in response.

In another example embodiment, the computing system may receive inputs associated with navigation of the robotic device. The navigation system may provide inputs to the computing system that signal for changes in navigation for the robotic device, such as altering direction, speed, gait, and/or other changes. For example, the computing system may receive an input that indicates the robotic device travel towards a particular destination, a change in operation (e.g., change in velocity), change in function (e.g., a variation in mechanics), change in direction, and/or other information.

In some cases, the computing system of a robotic device may receive an input for the robotic device to transition to perform a particular gait and/or to alter the current performance of the gait that the robotic device may be currently performing or about to perform. As an example illustration, an input received at the computing system may specify parameters for operation for the robotic device, such as a direction, velocity, acceleration, duration, mechanics, and/or a particular gait for the robotic device to switch into performing, among other information. For example, the computing system of the robotic device may receive an input that signals for the robotic device to increase speed and/or to travel to a particular point in the environment. The inputs may indicate changes in operation as a result of sensor data corresponding to the environment and/or internal operation of systems of the robotic device. To illustrate, the computing system may receive an input that indicates the robotic device should alter operation to adapt to an upcoming turn that may have been sensed using RADAR, LIDAR, a camera system, and/or other sensors of the robotic device.

In another example embodiment, the computing system of the robotic device may be configured to receive inputs from various sources, such as from interface communicating with user(s), other robotic devices, and/or various systems of the robotic device, among other sources. For example, the computing system of a robotic device may receive an input via a remote control having buttons, joystick(s), and/or other controls. The computing system may receive input from a user via other interfaces, such as microphones, and/or other types of interface.

In a further example embodiment, the computing system may continuously receive information from the GPS of the robotic device, which may serve as a source of localization indicating a location of the robotic device relative to coordinates or objects, for example. Moreover, the computing system may also utilize a path follower system that may indicate a direction or destination for the robotic device to travel. As such, the computing system may process incoming data provided by the GPS and/or other sensors of the robotic device to determine possible changes in operation, such as changes in performance of gaits, that the robotic device may want to perform based on the incoming data to continue functioning properly.

In some instances, the computing system may receive input(s) in response to the sensor system determining that the environment may be unsuitable for continuing to perform a current gait. The sensor system may indicate that the robotic device should switch gaits upon determining that the environment has one or more of too many obstacles, rough terrain, water hazards, and/or other possible elements. The computing system may be configured to process incoming data and information in real-time to determine proper operation for the robotic device.

In another example embodiment, the computing system of a robotic device may receive an input that indicates parameters that the computing system may determine multiple gaits be suitable to perform in response. The input may specify directly gaits to perform and may include an order, priority, and/or durations for performing the multiple gaits. As one example illustration, the computing system may receive an input for the robotic device to perform a walk gait for a specified duration or until the robotic device reaches a particular speed. Responsive to the robotic device satisfying the criteria set forth for the walk gait, the computing device may transition to perform the secondary gait of the input, such as a gallop gait at a faster velocity, for example. Similarly, the computing system may receive inputs that indicate locations to travel to or operations to have the robotic device perform, such as traveling in a direction at a desired speed. Other example inputs may be received by a robotic device as well.

At block 504, the method 500 may also include responsive to receiving the input, identifying respective gaits of a plurality of gaits associated with the robotic device that enable the robotic device to move in the environment at the given velocity. As the computing system of the robotic device receives inputs from various sources, the computing system may process the inputs to determine gaits that the robotic device may perform in response. In particular, the computing system may analyze the information provided within an input, such as the desired speed, operation, and/or time specified within the input to identify gaits and/or other operations of the robotic device that meet the requirements set forth in the input. The computing system may analyze inputs differently according to the information within each received input since some inputs may specify more parameters for operating than other inputs.

In one example embodiment, the computing system may identify techniques for navigating according to the input. The computing system may process the information provided with the input to identify gaits that may satisfy the requests within the input. For example, the computing system may receive an input that indicates the robotic device should travel at a faster velocity. Based on the input, the computing system may identify gaits and/or transition operations that the robotic device may perform in order to travel at the speed of the input. In some instances, the computing system may determine that the robotic device cannot perform a gait that operates according to parameters provided within the input. The computing system may identify one or multiple gaits that the robotic device can perform as desired by the input.

In some instances, the computing system may factor the power available to perform the gaits and/or additional information, such as recent operation of the robotic device for selecting a set of gaits to possibly use.

In one example embodiment, the computing system of the robotic device may wait to determine gaits and/or other operations for the robotic device to perform until determining at least one or multiple sets of selection criteria. The selection criteria may correspond to parameters of the environment, the state of the robotic device, and/or the input, for example. By waiting, the computing system may select a gait and/or operation for the robotic device to perform that is based on the environment, state of the robotic device, input, and/or other factors.

At block 506, the method 500 may include responsive to identifying the respective gaits, determining a first set of operation criteria for selecting a gait from the respective gaits for the robotic device to perform. As shown in FIGS. 1-4, an example robotic device performing the method 500 may be equipped with a sensor system having a variety of sensors configured to obtain information to assist with the operations of the robotic device. Among possibilities, the robotic device may include one or multiple sensors configured to acquire data about the environment of the robotic device. The robotic device may monitor and use information about the surrounding environment of the robotic device to assist in navigation and other functions, which may involve determining selection criteria (e.g., operation criteria) based on the environment to consider for selecting operations for the robotic device. This way, the computing system may actively select operations for the robotic device that may efficiently work in the environment of the robotic device.

As indicated, the computing system of the robotic device may use information about the environment to develop a first set of operation criteria for considering when selecting operations for the robotic device to perform, such as selecting a gait to perform in response to a received input. In some examples, the computing system may determine operation criteria based on different parameters of the environment, such as the roughness of the terrain, obstacles in the possible path of the robotic device, the stability and firmness of the ground, whether water hazards exist, and/or other possible parameters. Using the different parameters, the computing system of the robotic device may determine factors (e.g., operation criteria) to use for determining proper operation for the robotic device, including for selecting a gait for the robotic device to perform. In particular, the set of criteria that corresponds to the environment enables the computing system to analyze parameters associated with performing a gait in the environment to determine if the gait functions properly in the environment with the given parameters.

In one example embodiment, the computing system of the robotic device may develop selection criteria based on at least the various slopes and roughness of the terrain in the surrounding environment. Additionally, the computing system may also determine some operation-selection factors based on nearby objects in the environment that may pose as possible obstacles for the robotic device. For example, the computing system may develop a set of criteria that includes criteria based on rocks in the path and/or nearby the path of the robotic device in the environment. As such, the computing system may select gaits and/or other operations for the robotic device to perform that are capable of operating with multiple rocks in the path of the robotic device, such as a walking gait, for example. In some example embodiments, the computing system may develop additional criteria based on other elements of an environment not described herein.

At block 508, the method 500 may include modifying the first set of operation criteria based on prior operation of the robotic device in respective environments that have parameters substantially similar to the plurality of parameters of the environment of the robotic device. As described herein, the computing system may develop a set of criteria based on parameters of the environment for selecting a gait, multiple gaits, and/or other operations for the robotic device to perform in response to one or multiple inputs.

In some examples, the computing system of the robotic device may modify the set of environment criteria using data from one or multiple previous performances of the robotic device in the environment or environments having similar parameters to the current environment. The computing system may use past performances of the robotic device in similar environments to determine additional criteria to consider for selecting a gait and/or update the previously determined criteria that corresponds to the environment. As such, the computing system may prevent transitioning to a gait that may have previously proven to be unsuitable for environments having similar parameters. The previous performances may assist the computing system select operations that may allow the robotic device to operate properly and efficiently.

Additionally, in another example embodiment, the computing system may use information provided by other robotic devices to update the set of criteria that corresponds to the environment. As one example illustration, the computing system of the robotic device may receive data indicative of past performances of other robotic devices in similar environments. The computing system may factor the data of past performances of other robotic devices to update the criteria that corresponds to the environment. Further, the computing system of a robotic device may be programmed with data indicative of how the robotic device performs in certain environments. The computing system may utilize information indicative of the success rate of transitions in certain environments when determining selection criteria for choosing operations for the robotic device.

Furthermore, the computing system of the robotic device may communicate with nearby robotic devices to assist in updating the criteria of the environment and/or determining the robotic gait to perform. As such, the computing system of the robotic device may data, such as positive feedback and/or negative feedback from the nearby robotic devices performing a variety of gaits. Other examples may exist as well.

Additionally, the computing system may modify the set of criteria that corresponds to the environment based on map(s) of the environment. As such, the computing system may update the criteria to reflect the data provided within maps. The computing system may receive the map(s) from a server or may generate the maps as the robotic device operates in environments. The computing system may modify the criteria using additional sensor data received from sensors as well. Other types of modifications to the factors considered for selecting a gait based on the environment may exist as well.

At block 510, the method 500 may also determining a second set of operation criteria for selecting the gait from the respective gaits for the robotic device to perform. In addition to determining a first set of operation criteria that corresponds to the environment of the robotic device, the computing system may also develop a second set of operation criteria that may be based on parameters associated with the state of the robotic device and/or other operations of the robotic device. In particular, the second set of operation criteria may correspond to the current state of the robotic device, which may be based on the operation of mechanical features of the robotic device. As one example illustration, the computing system may develop a set of criteria for selecting a gait based on the current operation of the extendable legs of the robotic device.

In addition, the state of the robotic device may include criteria relating to the body orientation control of the robotic device. For instance, the body orientation control may include information associated with a pitch, roll, yaw, height, and velocity of the robotic device. For instance, the computing system may use the body control information associated with the state of the robotic device to prevent transitioning from a slower or stable gait to a faster or riskier gait unless the initial gait is tracking the body orientation well. Similarly, the computing system may automatically transition from a faster and/or riskier gait to a slower or more stable gait if the computing system is struggling to properly track a body orientation of the robotic device during the initial gait.

Further, the second set of operation criteria may also be based on an internal state indicative of the point of operation of a current gait of the robotic device. The computing system may analyze the current operation of one or multiple systems of the robotic device to develop additional factors to consider for determining a gait for the robotic device to perform. The computing system may develop the second set of operation criteria about the current operation of a gait by the computing system, such as the current point of the cycle of the gait. For example, the computing system may analyze the velocity (or general speed) of the current gait and/or speed of the robotic device in general.

The computing system may configure the criteria based on the state of the robotic device to prevent the selection of any gaits that are not compatible with the current gait, for example. As such, the computing system may develop criteria that may include delaying switching to a gait and/or other information to consider before providing instructions to systems to control the robotic device.

In some examples, the computing system may develop additional criteria based on the input received. In particular, the computing system may delay selecting possible gaits and/or sequences for transitioning until determining all the criteria to consider for selecting a gait or other operation to perform. As such, the computing system may develop selection criteria based on the input received. For one example illustration, the computing system may factor the input from the user, which may involve determining the speed that a user is commanding through a joystick interface. The different criteria that may be determined based on the input(s) may assist the computing system determine transition operations for the robotic device.

In one example embodiment, the computing system of the robotic device may use factors such as the current positions of the legs of the robotic device for the selection criteria for deciding upon future operations of the robotic device. The computing system may monitor operation of a behavior of the robotic device and determine that changes may be necessary as a result. As such, the computing system may provide levels of fault detection and response by monitoring the current internal state of the robotic device and/or the positions of the legs of the robotic device. In one example illustration, the computing system may determine, based on sensor data indicative of operations of the robotic device, that the robotic device is moving at a high velocity and may fall over. A gyroscope, accelerometer, and/or other types of sensors of the robotic device may capture data that indicates the lack of stability in the current operation of the robotic device. In response, the computing system may develop criteria that require the robotic device to perform a gait and/or other type of operation that allows more stability (e.g., transitioning to a slower, more stable state). The computing system may determine a slower gait, such as a trot or a walk may improve the operation of the robotic device based on the newly updated criteria corresponding to the current state of the robotic device.

At block 512, the method 500 may include responsive to determining both the modified first set of operation criteria and the second set of operation criteria, determining whether the respective gaits includes a given gait that enables the robotic device to move in the environment at the given velocity according to the modified first set of operation criteria and the second set of operation criteria. As previously indicated, the computing system of the robotic device may use the environment and/or the state or the robotic device as factors to consider when selecting the gait.

In one example embodiment, a computing system of the robotic device may use a "all or nothing" approach when analyzing whether or not to select a given gait. Using this approach, the computing system may compare the parameters associated with performing a gait to the set of criteria developed based on parameters of the environment and/or parameters associated with the state of the robotic device. For example, the computing system may analyze whether performing a given gait passes all the factors set forth in the criteria prior to selecting the gait for the robotic device to perform. Other examples may involve the computing system of the robotic device requiring that a transition operation satisfies each condition previously determined that corresponds to the input, environment, and/or state of the robotic device.

In some examples, the computing system may make the threshold for satisfying the selection criteria tighter and/or looser, which may involve changing the thresholds for specific conditions. For example, the computing system may determine that an operation, such as a new gait, may need to be in a large threshold within a selection condition based on the environment.

In another example embodiment, the computing system may weigh parameters associated with each previously identified gait in response to receiving the input to determine a gait that is more suitable to perform compared to other identified gaits based on the criteria corresponding to the environment and/or state of the robotic device.

In some instances, the computing system of the robotic device may determine that a particular gait passes some of the criteria that corresponds to the environment, but fails to satisfy other criteria that corresponds to the environment and/or the state of the robotic device. As such, the computing system may determine that the particular gait may not be suitable for the robotic device to perform at the given time. Similarly, the computing system may determine that a gait of the identified gaits may satisfy the factors to consider within the sets of criteria developed, but may determine that the gait requires too much power and/or cannot be performed by the robotic device at the desired velocity indicated within the input. The computing system may be configured to ensure that the computing system does not transition the robotic device to perform a behavior that puts the robotic device into a bad condition (e.g., high likelihood of falling or other type of failure).

Further, based on the criteria, the computing system may determine transition sequences that enable the robotic device to efficiently switch operations. For example, the computing system may receive an input from a user via a joystick that indicates the robotic device should travel at a high level of speed (e.g., 20 mph). The computing system may determine that the environment may enable the high level of speed, but the robotic device is currently standing stationary. Therefore, the computing system may provide an intermediate gait or sequence that the robotic device may perform to build up speed until reaching the desired high level of speed.

Additionally, the computing system may be configured to determine that the transition into a new operation works with the current state of the gait cycle for the robotic device. In some instances, the computing system may delay the transition until reaching a proper point in the current gait cycle that enables the transition to occur.

In another example embodiment, the computing system may determine, based on the selection criteria generated from the environment and the state of the robotic device, that the robotic device should execute a safety gait, which may involve stopping or operating at a slower speed, for example. The computing system may determine that the environment may place the robotic device in unsuitable or dangerous situation if the robotic device performs various gaits and in response, select a safety gait for the robotic device to perform. In some instances, the safety gait may be the current gait of the robotic device and may be performed at a slower speed, for example. The computing system may determine transition sequences and/or other operations as well.

At block 514, the method 500 may include based on determining that the respective gaits include the given gait that enables the robotic device to move in the environment at the given velocity, providing instructions to one or more systems of the robotic device to perform the given gait. The computing system of the robotic device may provide instructions to systems of the robotic device to control the robotic device according to the analysis described above. In particular, the computing system may provide instructions for the robotic device to perform a selected gait.

In some instances, the computing system may determine that the environment and/or the state of the robotic device do not permit the robotic device to perform a gait in response to a received input. For example, the robotic device may determine that the environment is unsuitable for navigation and provide instructions to systems to stop operation of the robotic device or for the robotic device to perform an operation in another direction not included within the received input. As one example illustration, the robotic device may recognize that the environment includes a river, fence, or similar obstacle that may prevent the robotic device from traversing the environment in a particular direction. Rather than selecting a gait, the computing system may provide instructions based on the sensor data or to perform a safety gait, such as stopping. The computing system may select a safety gait in response to determining that the environment includes multiple obstacles that may impact an operation of the robotic device.

The instructions may include a variety of information for the systems to operate by, such as a speed for operating the selected gait and/or duration of time for performing the gait. Likewise, the instructions may specify a direction and specific parameters for operating the mechanics of the robotic device.

In one example embodiment, the computing system may cycle between different gaits based on incoming data provided by the sensor systems of the robotic device. The computing system may enable the robotic device to efficiently transition between a walking gait and a bound gait, for example.

In another example embodiment, a robotic device may be configured to follow a user, for example. In similar examples, the robotic device may follow another robotic device, a vehicle, an animal, and/or another entity. The robotic device may use sensors to follow the user based on visual cues and/or audible cues, for example. Other methods of following may be used as well. As such, while following the user, the robotic device may be configured to operate at higher and lower speeds depending on the speed of the user.

The computing system of the robotic device may use method 500 or a similar method to automatically transition the robotic device to follow the user at speeds that correspond to the user's speed. The computing system may automatically transition the robotic device to perform different gaits at higher or lower speeds as well as providing instructions for the robotic device to stop when the user stops. During the various transitions as well as throughout the operation, the computing system may use selection criteria for deciding upon different operations based on one or multiple factors, such as the speed and direction of the user, parameters of the environment, past performances of the robotic device, the state of the robotic device, and/or other factors. Some transitions between behaviors of the robotic device may require more and/or less analysis and consideration before enabling the transitions.

In yet another example embodiment, the computing system of a robotic device may throttle down the speed of the robotic device based on the state of the device before instructing systems to perform a transition into a gait that requires a slower speed, velocity, or acceleration than the previous gait. As such, the computing system may also determine that the operation of the legs, such as the legs current point of operation, allow for a transition to occur at that point. In some cases, the computing system may wait to transition until the legs are determined to be placed on the ground, for example.

Figure 6:
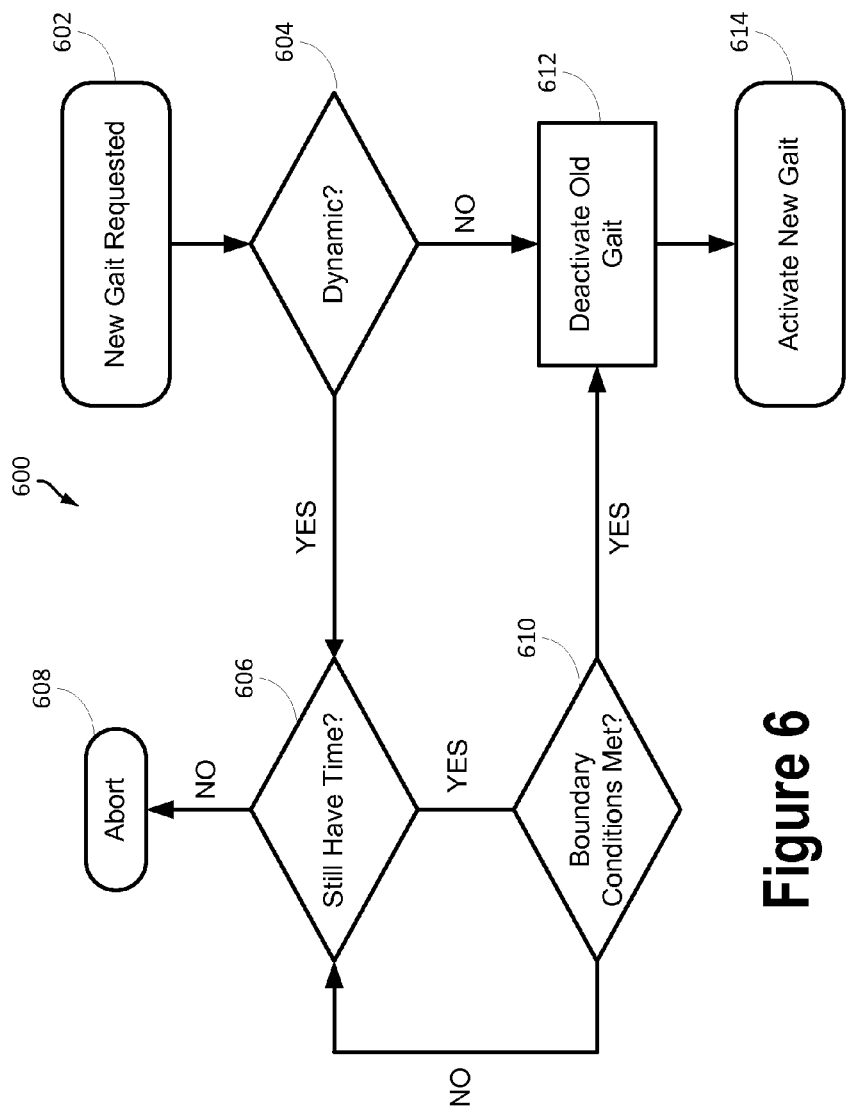
FIG. 6 is another example flowchart for automatic gait transition.

FIG. 6 is another example flowchart for automatic gait transition. Similar to the example method 500 shown in FIG. 5, a computing system of a robotic device may perform the method 600 or similar methods for transitioning the robotic device between performing different gaits. Likewise, the method 600 may enable the computing system to alter operation of a current gait by the robotic device. The method 600 may include one or more operations, functions, or actions as illustrated by one or more blocks 602-612. Although the blocks are illustrated in a sequential order, these blocks may, in some instances, be performed in parallel, and/or in a different order than those described herein. Also, the various blocks may be combined into fewer blocks, divided into additional blocks, and/or removed based upon the desired implementation.

At block 602, the method 600 includes receiving an input that corresponds to a new gait. As described herein, the computing system of the robotic device may receive various inputs during the operation of the robotic device, which may include inputs indicative of changes in navigation. In some instances, the computing system may receive inputs that correspond to requesting performance of a new gait by the robotic device.

In one example embodiment, the computing system may receive the input from a sensor system and/or other system of the robotic device. In another example, the computing system may receive the input from an outside source, such as another robotic device or a user. Additionally, the new gait request may include parameters for performing the gait, such as a velocity and mechanics for operating the legs, for example. Other example inputs requesting new gaits may be received by the computing system of the robotic device as well.

At block 604, the method 600 may include determining whether the new gait requested involves a dynamic change. The computing system may process the input to determine if the new gait may require a dynamic change by the robotic device. As one example illustration, the computing system may compare the new gait relative to the current gait of operation of the robotic device.

In the case that the computing system determines that the new gait requested within an input amounts to the current gait, the computing system may determine that the new gait request does not involve a dynamic change for the robotic device. In such a case, the computing system may continue to perform the current gait without changes unless indicated within the received input or may continue to block 612 to deactivate the old gait. The robotic device may perform other actions in response to determining that a dynamic action may not be involved as well.

In response to determining that the new gait request involves a dynamic operation, the computing system may proceed to block 606 of method 600, which may involve the computing system determining whether the new gait request satisfies any time requirements that may be associated with performing the new gait or altering operation of the robotic device overall.

At block 606, the method 600 involves determining if the computing system has time to execute the new gait. As indicated, prior to switching to the new gait, the computing system may determine if switching the operation of the robotic device to the new gait satisfies possible time requirements associated with the transition process. Potential timing issues may arise from too much processing by the computing system or a long delay since receiving the request to perform the new gait. Other timing parameters may be considered within examples as well.

Additionally, the computing system may determine whether to transition based on the state of the robotic device and/or other parameters of operation, such as the amount of time that has passed since receiving the gait request, whether or not to continue analyzing whether or not to perform the new gait. The computing system may determine whether the timing of internal components may allow the transition of the robotic device into the new gait. If the computing system determines that the new gait request fails one of the available time tests, the computing system may proceed to block 608 that may result in abandonment of the request for the new gait. However, in the case that the computing system determines that enough time exists, the computing system may proceed to block 610 that may involve using tests derived from the environment of the robotic device.

At block 608, the method 600 may include aborting the new gait request. The computing system may start processing other information by aborting the gait request until receiving a new gait request. In some instances, the computing system may delay performance of the new gait. The computing system may provide an aborting signal to a user in some instances. For example, the interface may relay a message to the user specifying possible reasons for denying the user's request for the new gait. Similarly, the robotic device may signal an abandonment of a new gait request through visual or audio signals. Aborting the new gait request may involve the computing system performing other parameters within other examples.

At block 610, the method 600 includes determining whether the boundary conditions for performing the new gait are met. The computing system may determine transition timing based on a state associated with the robotic device. For instance, transition timing associated with executing a gait may depend on the position of legs of the robotic device as well as other information associated with the robotic device, such as the body orientation, height, etc., of the robotic device. Additionally, prior to determining whether to transition, the computing system may consider the state of the robotic device as well as maintaining the posture, speed, and/or other current parameters of the robotic device during the transition. In some instances, the computing system may analyze sensor data indicative of the environment and/or other boundary conditions to use during the performance of a given gait.

At block 612, the method 600 includes deactivating the old gait. The computing system may deactivate the old gait prior to activating a new gait. The computing system may provide instructions to the systems of the robotic device to deactivate the old gait. In addition, the instructions may include additional parameters associated with deactivating the current operation of the robotic device.

At block 614, the method 600 includes activating the new gait. The computing system may provide instructions to systems of the robotic device to perform the new gait as received within the input. Activating the new gait may involve a transition sequence, which may involve performing various operations to enter into performing the new gait. Additionally, performing the new gait may include performing parameters associated with the new gait, which may include a velocity, speed, acceleration, duration, mechanics, and/or other possible parameters. Other examples may exist as well.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    receiving, at a computing system of a robotic device in an environment, an input for the robotic device to move in the environment at a given velocity;
    responsive to receiving the input, identifying respective gaits of a plurality of gaits associated with the robotic device that enable the robotic device to move in the environment at the given velocity;
    responsive to identifying the respective gaits, determining a first set of operation criteria for selecting a gait from the respective gaits for the robotic device to perform, wherein the first set of operation criteria is based on sensor data indicative of a plurality of parameters of the environment, and wherein the plurality of parameters include respective parameters indicative of a slope and roughness of the environment;
    modifying the first set of operation criteria based on prior operation of the robotic device in respective environments that have parameters having a threshold similarity according to a set of criteria to the plurality of parameters of the environment of the robotic device;
    determining a second set of operation criteria for selecting the gait from the respective gaits for the robotic device to perform, wherein the second set of operation criteria is based on a state of the robotic device indicative of both respective operation of extendable legs of the robotic device and an internal state indicative of a point of operation of a current gait of the robotic device;
    responsive to determining both the modified first set of operation criteria and the second set of operation criteria, determining whether the respective gaits include a given gait that enables the robotic device to move in the environment at the given velocity according to the modified first set of operation criteria and the second set of operation criteria by:
        determining at least two gaits of the respective gaits that enable the robotic device to move in the environment at the given velocity according to the modified first set of operation criteria and the second set of operation criteria; and
        based on determining the at least two gaits, selecting the given gait that uses less power from the at least two gaits for the robotic device to perform; and
    based on determining that the respective gaits include the given gait that enables the robotic device to move in the environment at the given velocity, providing instructions to one or more systems of the robotic device to perform the given gait.

2. The method of claim 1, wherein receiving the input for the robotic device to move in the environment at the given velocity comprises:
    receiving the input from a sensor system of the robotic device, wherein the sensor system includes one or more of RADAR, LIDAR, a global positioning system (GPS), an accelerometer, vision system, and a gyroscope.

3. The method of claim 1, wherein receiving the input for the robotic device to move in the environment comprises:
    receiving the input from a respective communication interface of the robotic device, wherein the respective communication interface includes one or more of a mobile device, a joy stick controller, and a microphone.

4. The method of claim 1, wherein modifying the first set of operation criteria further includes modifying the first set of operation criteria based on one or more maps of the environment.

5. The method of claim 1, further comprising:
    based on determining that the respective gaits lack the given gait that enables the robotic device to move in the environment at the given velocity of the input, providing instructions to one or more systems of the robotic device to perform a safety gait comprising a gait pattern that enables the robotic device to operate in the environment according to the modified first set of operation criteria and the second set of operation criteria.

6. The method of claim 5, wherein the safety gait enables the robotic device to move in the environment at a velocity slower than the given velocity of the input.

7. The method of claim 5, wherein the safety gait comprises stopping the robotic device from moving in the environment as a result of determining that the environment comprises a plurality of obstacles.

8. The method of claim 1, wherein based on determining that the respective gaits include the given gait that enables the robotic device to move in the environment at the given velocity, providing instructions to one or more systems of the robotic device to perform the given gait comprises:
    providing instructions for transitioning the robotic device from the state of the robotic device to the given gait, wherein the instructions includes a transition sequence for transitioning the robotic device from the internal state indicative of the point of operation of the current gait of the robotic device to performing the given gait.

9. The method of claim 8, wherein the transition sequence includes one or more intermediate gaits for transitioning from the point of operation of the current gait of the robotic device to the given gait.

10. The method of claim 1, further comprising:
    based on determining that the respective gaits lack the given gait that enables the robotic device to move in the environment at the given velocity of the input, providing instructions to one or more systems of the robotic device to continue performing the current gait.

11. A system comprising:
    at least one processor; and
    a memory having stored thereon instructions that, upon execution by the at least one processor, cause the system to perform functions comprising:
        receiving an input for a robotic device to move in an environment at a given velocity;
        responsive to receiving the input, identifying respective gaits of a plurality of gaits associated with the robotic device that enable the robotic device to move in the environment at the given velocity;
        responsive to identifying the respective gaits, determining a first set of operation criteria for selecting a gait from the respective gaits for the robotic device to perform, wherein the first set of operation criteria is based on sensor data indicative of a plurality of parameters of the environment, and wherein the plurality of parameters include respective parameters indicative of a slope and roughness of the environment;
        modifying the first set of operation criteria based on prior operation of the robotic device in respective environments that have parameters having a threshold similar according to a set of criteria to the plurality of parameters of the environment of the robotic device;
        determining a second set of operation criteria for selecting the gait from the respective gaits for the robotic device to perform, wherein the second set of operation criteria is based on a state of the robotic device indicative of both respective operation of extendable legs of the robotic device and an internal state indicative of a point of operation of a current gait of the robotic device;

responsive to determining both the modified first set of operation criteria and the second set of operation criteria, determining whether the respective gaits include a given gait that enables the robotic device to move in the environment at the given velocity according to the modified first set of operation criteria and the second set of operation criteria by:

determining at least two gaits of the respective gaits that enable the robotic device to move in the environment at the given velocity according to the modified first set of operation criteria and the second set of operation criteria; and based on determining the at least two gaits, selecting the given gait that uses less power from the at least two gaits for the robotic device to perform; and based on determining that the respective gaits include the given gait that enables the robotic device to move in the environment at the given velocity, providing instructions to one or more systems of the robotic device to perform the given gait.

12. The system of claim 11, wherein, responsive to determining both the modified first set of operation criteria and the second set of criteria, determining whether the respective gaits include the given gait that enables the robotic device to move in the environment at the given velocity according to the modified first set of operation criteria and the second set of operation criteria comprises:

determining whether the robotic device is able to transition from the internal gait state to the given gait.

13. The system of claim 11, wherein the state of the robotic device indicative of both respective operation of extendable legs of the robotic device and the internal state indicative of the point of operation of the current gait of the robotic device is further indicative of a body orientation control of the robotic device, wherein the body orientation control includes information associated with a pitch, a roll, a yaw, a height, and a velocity of the robotic device.

14. The system of claim 11, wherein determining whether the respective gaits include the given gait that enables the robotic device to move in the environment at the given velocity according to the modified first set of operation criteria and the second set of operation criteria further comprises:

determining whether a power level of the robotic device enables the robotic device to perform the given gait.

15. The system of claim 11, wherein providing instructions to one or more systems of the robotic device to perform the given gait comprises:

providing instructions to perform the given gait at a lower velocity than a current velocity of the robotic device when the robotic device executes one or more turns in the environment; and providing instructions to perform the given gait at the given velocity of the input when the robotic device travels in an approximately straight path.

16. A non-transitory computer readable medium having stored therein instructions, that when executed by a computing device, cause the computing device to perform functions comprising:

receiving an input for a robotic device to move in an environment at a given velocity;

responsive to receiving the input, identifying respective gaits of a plurality of gaits associated with the robotic device that enable the robotic device to move in the environment at the given velocity;

responsive to identifying the respective gaits, determining a first set of operation criteria for selecting a gait from the respective gaits for the robotic device to perform, wherein the first set of operation criteria is based on sensor data indicative of a plurality of parameters of the environment, and wherein the plurality of parameters include respective parameters indicative of a slope and roughness of the environment;

modifying the first set of operation criteria based on prior operation of the robotic device in respective environments that have parameters having a threshold similarity according to a set of criteria to the plurality of parameters of the environment of the robotic device;

determining a second set of operation criteria for selecting the gait from the respective gaits for the robotic device to perform, wherein the second set of operation criteria is based on a state of the robotic device indicative of both respective operation of extendable legs of the robotic device and an internal state indicative of a point of operation of a current gait of the robotic device;

responsive to determining both the modified first set of operation criteria and the second set of operation criteria, determining whether the respective gaits include a given gait that enables the robotic device to move in the environment at the given velocity according to the modified first set of operation criteria and the second set of operation criteria by:

determining at least two gaits of the respective gaits that enable the robotic device to move in the environment at the given velocity according to the modified first set of operation criteria and the second set of operation criteria; and based on determining the at least two gaits, selecting the given gait that uses less power from the at least two gaits for the robotic device to perform; and based on determining that the respective gaits include the given gait that enables the robotic device to move in the environment at the given velocity, providing instructions to one or more systems of the robotic device to perform the given gait.

17. The non-transitory computer readable medium of claim 16, wherein responsive to receiving the input, identifying respective gaits of the plurality of gaits associated with the robotic device that enables the robotic device to move in the environment at the given velocity comprises:

identifying the respective gaits by determining the respective gaits that operate within respective ranges of velocity that include the given velocity.

18. The non-transitory computer readable medium of claim 16, wherein the state of the robotic device indicative of both respective operation of extendable legs of the robotic device and the internal state indicative of the point of operation of the current gait of the robotic device is further indicative of a body orientation control of the robotic device, wherein the body orientation control includes information associated with a pitch, a roll, a yaw, a height, and a velocity of the robotic device.

19. The non-transitory computer readable medium of claim 16, wherein the plurality of gaits associated with the robotic device includes a stand gait, a walk gait, a jog gait, a bound gait, a gallop gait, and a safety gait.

* * * * *